Figure 1:
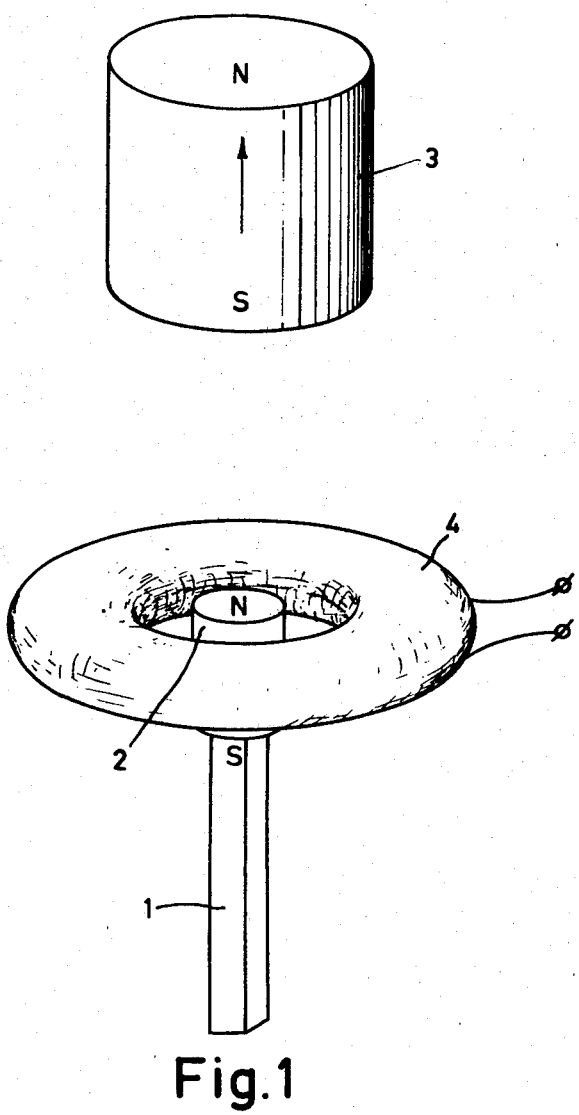

United States Patent [19]

van der Heide

[11] 4,356,772

[45] Nov. 2, 1982

[54] MAGNETICALLY LEVITATED OBJECT

[75] Inventor: Hendrik van der Heide, Eindhoven, Netherlands

[73] Assignee: U.S. Philips Corporation, New York, N.Y.

[21] Appl. No.: 776,477

[22] Filed: Mar. 10, 1977

Related U.S. Application Data

[62] Division of Ser. No. 467,384, May 6, 1974, Pat. No. 4,040,681.

[30] Foreign Application Priority Data

May 21, 1973 [NL] Netherlands .......................... 7307042

[51] Int. Cl.³ .......................................... B61B 13/00
[52] U.S. Cl. ..................................... 104/282; 104/283; 104/284; 104/290; 310/12
[58] Field of Search .... 104/148 R, 148 LM, 148 MS, 104/148 SS, 23 FS, 134, 281–284, 287, 288, 290, 293; 308/10; 310/12; 105/193

[56] References Cited

U.S. PATENT DOCUMENTS

| | | | |
|---|---|---|---|
| 3,158,765 | 11/1964 | Polgreen | 310/12 |
| 3,313,245 | 4/1967 | Sundby | 105/193 X |
| 3,628,072 | 12/1971 | Nicholson | 104/148 LM |
| 3,696,753 | 10/1972 | Ross et al. | 104/148 LM |
| 3,797,398 | 3/1974 | Bliss | 104/23 FS |
| 3,885,504 | 5/1975 | Baermann | 104/148 MS |
| 3,899,979 | 8/1975 | Godsey, Jr. | 104/148 MS |
| 3,913,493 | 10/1975 | Maki et al. | 104/148 MS |
| 3,915,093 | 10/1975 | Barthalon et al. | 104/148 LM |

*Primary Examiner*—Randolph A. Reese
*Attorney, Agent, or Firm*—Robert T. Mayer; Bernard Franzblau

[57] ABSTRACT

A magnetically levitated carriage provided with a magnetic system suspension consisting of support magnets which magnetically cooperate via an air gap. The levitated carriage is maintained in a stable condition by means of a stabilizing device which substantially comprises a row of first stabilizing magnets connected to the levitated carriage and a row of parallel arranged second stabilizing magnets. The dynamic stiffness due to the stabilizing device is greater than the static stiffness due to the support magnets.

10 Claims, 8 Drawing Figures

MAGNETICALLY LEVITATED OBJECT

This is a division, of application Ser. No. 467,384, filed May 6, 1974 now U.S. Pat. No. 4,040,681.

The invention relates to a magnetically levitated object provided with at least one first support magnet which, via an air gap, cooperates magnetically with at least one fixed second permanent support magnet.

On the basis of the known principle that two permanent magnets repel each other when the facing magnetic poles are of like nature, attempts have long been made to use this property for frictionless displacement. However, the system based on this principle has the disadvantage of being unstable (Earnshaw theorem). Even the slightest horizontal displacement of the first support magnet relative to the second one causes the system to tip over.

To prevent such tip-over the first magnet is disposed in a guide. A known example consists in placing two axially oppositely magnetized permanent magnet rings one above the other in a glass cylinder.

A more practical embodiment is the magneticlevitation train as described in U.S. Pat. No. 3,158,765 or in United Kingdom Pat. No. 867,045. The lower surface of each vehicle of the train is provided with a plurality of parallel arranged equally magnetized permanent magnets (first magnets) the disposition of which corresponds to fixed rows of support magnets serving as rails (second magnets).

The "horizontal stability" of each carriage is obtained by a guide strip secured to it which is in contact with the inner vertical side of the U-shaped guideway. The magnetic rails are mounted in the U-shaped guideway.

This system has the disadvantage that the movement of the train is not frictionless.

It is an object of the present invention to avoid the disadvantages due to instability and the invention is characterized in that in order to maintain the levitated object in a stable condition, a stabilizing device is provided which substantially comprises two main elements one of which is connected to the levitated object and which comprise at least one permanent stabilizing magnet and a system which produces a magnetic alternating field in which the stabilizing magnet is arranged, the amplitude of the field remaining constant.

Numerous experiments have shown that stable equilibrium is obtained under given conditions. These conditions are determined by many factors, including the power of the magnets used, the weight of the levitated object, the value of the magnetic alternating field and its frequency.

It has been found that such a levitated magnet system can be approximated by the Mathieu equation:

$$m\, d^2x/d\,t + (a + b \cos 2t)x = 0$$

where:
- $m$ = mass of the levitated object
- $a$ = static stiffness.
- $b$ = dynamic stiffness.
- $x$ = deviation of the levitated object from the correct position; for moving objects this deviation is at right angles to the direction of movement.

The static stiffness is due to the magnetic cooperation of the two support magnets.

The dynamic stiffness is due to the magnetic alternating field.

Writing $\omega_0 = \sqrt{a/m}$
and
$\omega_1 = \sqrt{b/m}$
the Mathieu equation becomes:

$$d^2x/d(\omega t)^2 + (\omega_0^2\omega^2 + \omega_1^2\omega^2 \cos 2\omega t)x = 0$$

where:
- $\omega_0$ = angular frequency of an oscillation determined by the static stiffness $a$ and the mass $m$,
- $\omega_1$ = angular frequency of an oscillation determined by the dynamic stiffness $b$ and the mass $m$,
- $x$ = the deviation of the levitated object from the correct position both with respect to translation and to rotation in three orthogonal dimensions.

For levitation of the object the stable condition must apply to all six degrees of freedom.

When the results of measuments obtained from experiments are represented in graphical form in diagrams in which the stiffnesses $a$ and $b$ are plotted, both stable and unstable regions occur. It is possible to obtain a stable condition for all six degrees of freedom simultaneously.

In the direction of maximum instability—that is in the vertical direction for a "suspended" object and in the horizontal direction for a "standing" object —the dynamic stiffness $(\omega_1/\omega)^2$ due to the stabilizing device must be many times (preferably six times) greater than the static stiffness $(\omega_0/\omega)^2$ due to the support magnets.

An embodiment of a magnetically levitated object according to the invention is characterized in that the stabilizing magnet also serves as the first support magnet.

This embodiment is in the form of a stationary levitated object, the two support magnets being vertically aligned and being magnetized in the same direction, while the first support magnet is surrounded by a coil connected to an alternating-current generator.

A particular embodiment of a stationary levitated object is a magnetic bearing.

In this embodiment the levitated object is provided with a horizontal shaft which at each end carries a first support magnet surrounded by a coil connected to an alternating-current generator. The two coils may be connected in series with one another. Good results have been achieved with two single-turn windings connected to a low-voltage transformer for supplying a large current, the bearing being maintained in a condition of levitation for a continuous period of several days. Such a magnetic bearing can advantageously be used in spaces in which a vacuum occurs (space flight). A particularly suitable embodiment is used in an X-ray tube in which the anode is mounted on a shaft which is required to revolve at a high speed to prevent burning of the anode. In conventional X-ray tubes ball bearings are used, with a consequent limitation of the useful life.

However, the invention may also be used in other embodiments in the form of a moving object, for example, a propelled levitated train.

Such a train can attain high speeds (a cruising speed of 500 km per hour), because only air friction is produced (see Elseviers Weekblad, Jan. 27, 1973, pages 60–69).

According to the invention this embodiment is characterized in that a row of second stabilizing magnets alternately magnetized in opposite directions are disposed parallel to the rails, the length of these magnets in the travelling direction of the levitated object being substantially equal to that of each first stabilizing magnet.

The stabilizing magnets may form part of a linear motor as described in principle in the abovementioned United Kingdom Pat. No. 867,045. The magnetically levitated train may be either "standing" or "suspended".

The "standing" embodiment is characterized in that the carriage has an undercarriage provided with at least two parallel arranged first support magnets the disposition of which corresponds to that of second support magnets arranged in the form of rails. The first and second support magnets are magnetized in relative opposite directions, while the undercarriage is coupled to the remainder of the carriage by a linear damping system which operates in a horizontal direction at right angles to the travelling direction.

The "suspended" embodiment is characterized in that the upper side of the carriage is provided with a suspension truck comprising at least one first support magnet located beneath a plurality of second support magnets arranged in the form of rails. The first and second support magnets are magnetized in the same direction, the suspension truck being coupled to the remainder of the carriage by a vertically acting linear damping system.

In both embodiments a linear damping system is provided for damping oscillation in horizontal lateral directions. This oscillation does not fully satisfy the abovementioned Mathieu equation, however, in principle stable regions can be distinguished from unstable regions, while it should be mentioned that the stable regions are increased.

Figure 2:
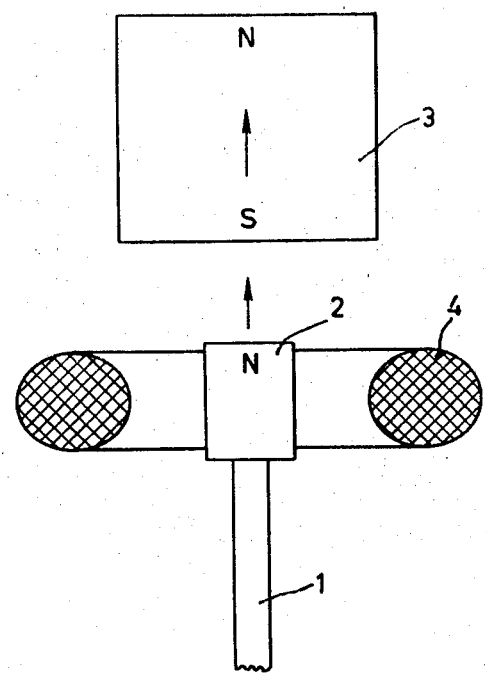
Figure 3:
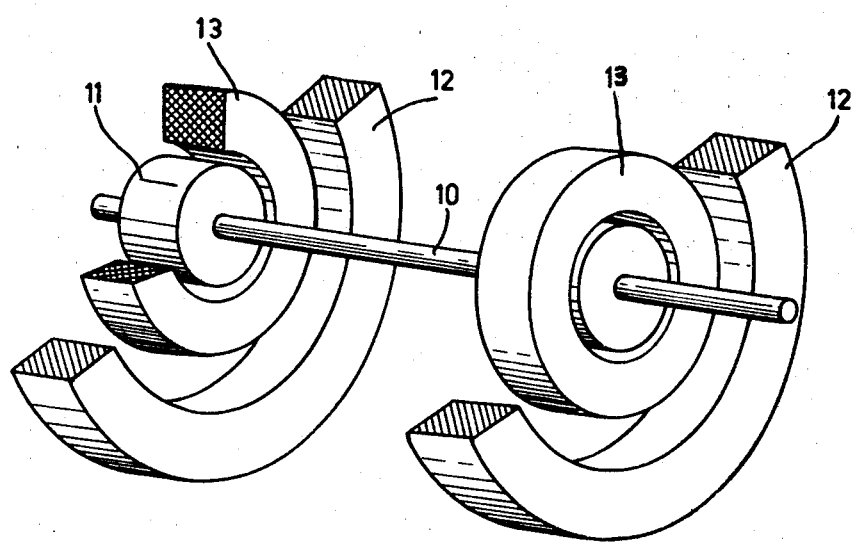
Figure 4:
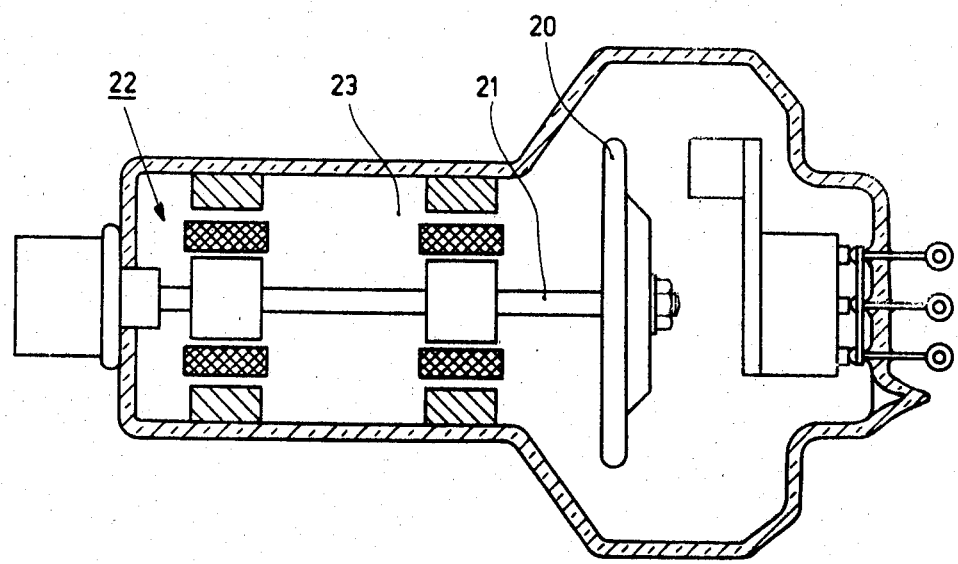
Figure 6:
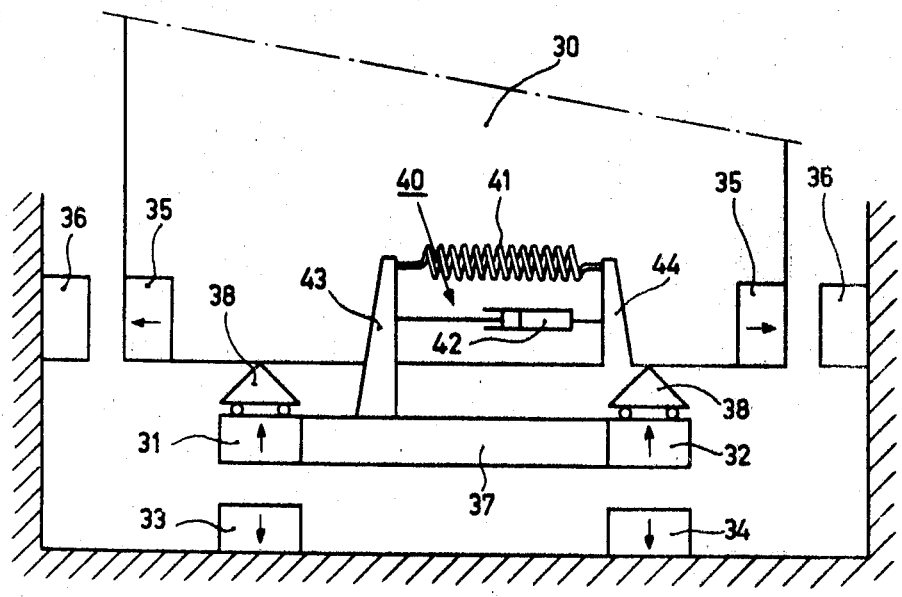
Figure 5:
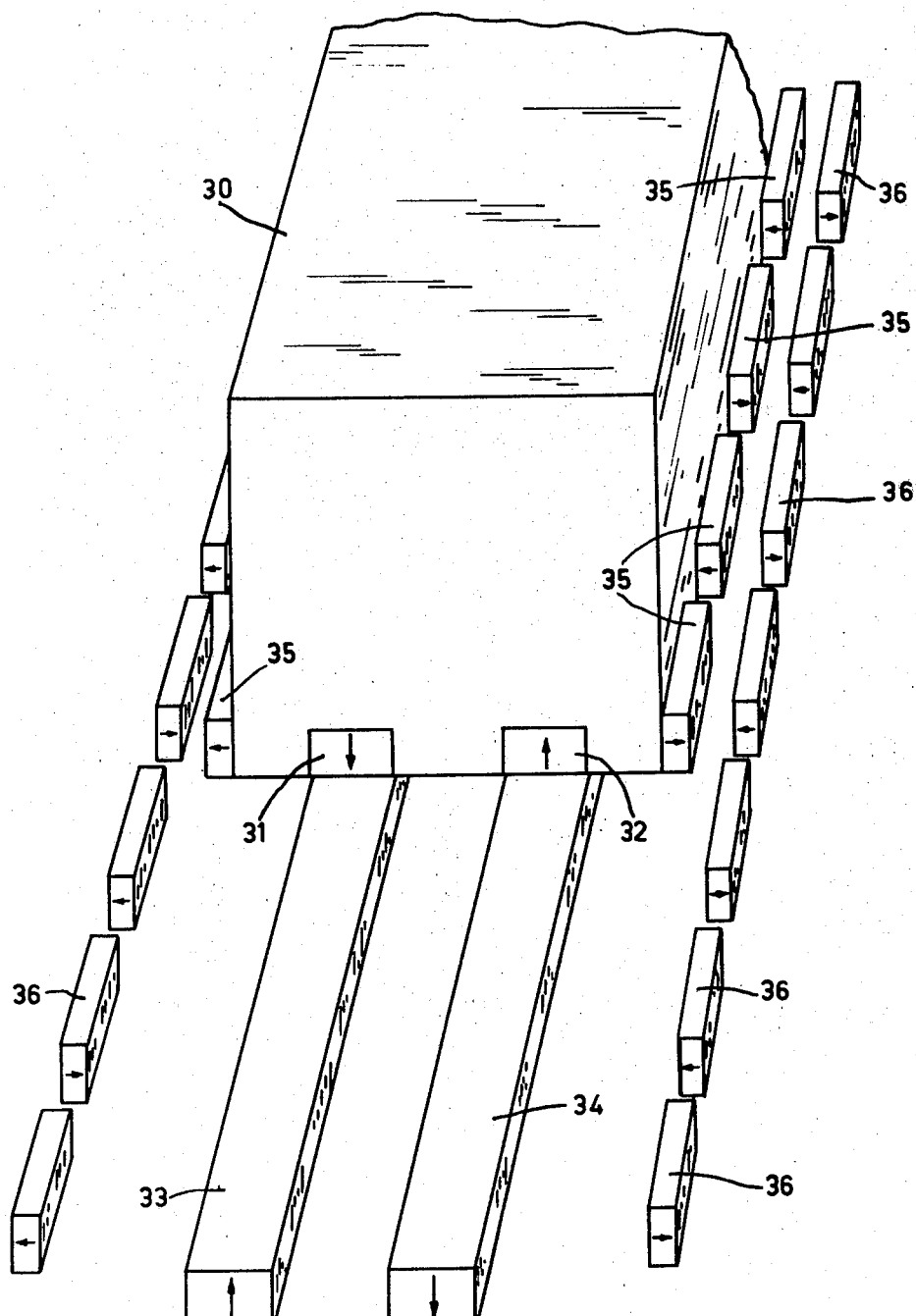
Figure 7:
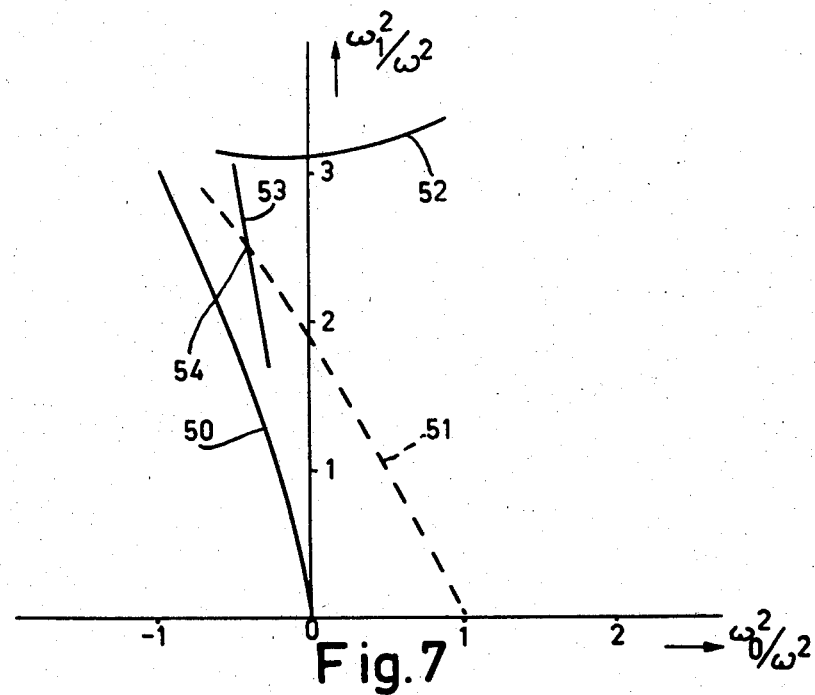
Figure 8:
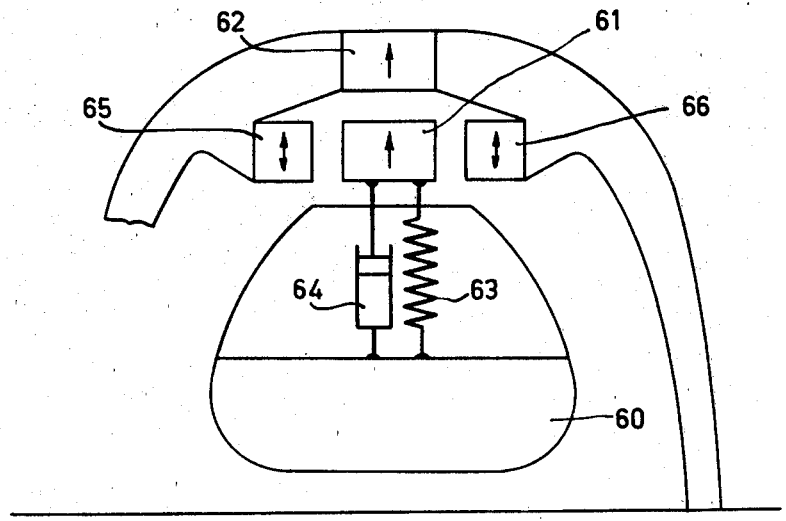

Embodiments of the invention will now be described, by way of example, with reference to the accompanying diagrammatic drawings, in which:

FIG. 1 is a perspective view of a vertically levitated stationary object according to the invention, FIG. 2 is a cross-sectional view thereof, FIG. 3 is a perspective view of a horizontally levitated bearing according to the invention, FIG. 4 shows an X-ray tube according to the invention, FIG. 5 is a perspective view of a magnetically levitated train including a stabilizing system according to the invention, FIG. 6 shows a "standing" levitated train provided with a damping system according to the invention, FIG. 7 is an associated Mathieu diagram, and FIG. 8 shows a "suspended" levitated train provided with a damping system according to the invention.

Referring now to FIGS. 1 and 2, an object 1 is levitated by means of the magnetic attraction between a first support magnet 2 attached to the object 1 and a fixed second support magnet 3.

The two magnets are vertically aligned and are equally magnetized axially. The south pole S of the support magnet 3 faces the north pole N of the support magnet 2. As a result the magnet 3 pulls the object 1 and the magnet 2 upward. Owing to the weight of the object 1 and the magnet 2 there is a location at which the force of magnetic attraction is equal to the force of gravity so that an unstable equilibrium is produced.

The support magnet 2 is surrounded by a coil 4 which is connected to an electric alternating voltage. The support magnet 2 is located substantially at the center of the coil 4. Owing to the magnetic alternating field between the coil 4 and the first support magnet 2 equilibrium will become stable under certain conditions.

These conditions are determined by the magnetic quantities of the support magnets 2 and 3, the weight of the levitated object 1 (including the weight of the support magnet 2), the diameter and the number of turns of the coil 4 and the magnitude and frequency of the current flowing through the coil 4. When the coil is connected to the alternating-current source, the alternating current is increased to the desired magnitude value and maintained constant at this value.

FIG. 3 shows a stationary levitated object in the form of a journalled shaft. The shaft 10 is mounted in two bearings. Each bearing comprises a first support magnet 11 and a second support magnet 12. The support magnet 11 is disc-shaped and coaxially surrounds the shaft. The second support magnet 12 has the form of one half of a ring and is arranged coaxially with the shaft 10 and vertically beneath the support magnet 11. The two support magnets of each bearing are axially magnetized in the same direction.

A coil 13 connected to an alternating-voltage supply (not shown) is disposed between the support magnets 11 and 12 coaxially therewith. The manner in which the coil may be supported is quite conventional and has not been shown for the sake of brevity and clarity, as it is not an essential part of the invention.

During experiments such a magnetically journalled shaft remained in a stably levitated condition for a continuous period of several days.

Such magnetic bearings are very suitable for use in an X-ray tube in which an anode is required to rotate at a high speed.

FIG. 4 shows an X-ray tube in which an anode 20 is secured to a shaft 21 which is maintained in stable equilibrium in magnetic bearings 22 and 23. The magnetic bearings are of the kind shown in FIG. 3.

FIG. 5 shows schematically part of a carriage of a magnetically levitated train. The carriage 30 is provided with two rows of first support magnets 31 and 32, the dispositions of which correspond to those of the support magnets 33 and 34 arranged in the form of rails.

The rail shape is shown schematically. The support magnets 31 and 32 are oppositely magnetized to the support magnets 33 and 34 respectively so that they are repelled by one another.

To each vertical side of the carriage which extends parallel to the travelling direction, a row of first stabilizing magnets 35 are secured which alternately are magnetized in opposite directions.

Second stabilizing magnets 36 are disposed in the form of rails parallel to the rows of magnets 35. The magnets 36 also are alternately magnetized in opposite directions. The stabilizing magnets 35 and 36 are tile shaped and are of equal size.

By means of the stabilizing magnets stabilization is obtained in the horizontal direction at right angles to the travelling direction.

FIG. 6 is a schematic cross-sectional view of a carriage provided with support magnets and stabilizing magnets.

In order to increase the stable operating range a linear damping system is coupled to the carriage. For this purpose the carriage 30 is movably connected to an under-carriage 37 to which the support magnets 31 and 32 are secured. The carriage 30 is supported on the undercarriage 37 by rollers 38.

A linear damping system 40 comprises a spring 41 and a shock absorber 42. The spring and the shock absorber are mounted between a support 43 secured to the undercarriage 37 and a support 44 secured to the carriage 30.

The associated Mathieu diagram is shown in FIG. 7. The static stiffness $(\omega_0/\omega)^2$ and the dynamic stiffness $(\omega_1/\omega)^2$ are plotted as the abscissa and ordinate respectively. The stable region, without the use of damping, lies between a solid line 50 and a broken line 51 and with the use of damping lies between the solid lines 50 and 52. The addition of the damping considerably increases the stable region.

It has been found that an operation line 53 gives optimal results. For a point 54 having coordinates of −0.4 and +2.4 the following data was determined from experiments:

weight of carriage and undercarriage: 10 tons.
weight of the carriage: 7.5 tons.
weight of the undercarriage: 2.5 tons
horizontal angular frequency $\omega = 40$ rad/sec.
number of pole pairs of stabilizing magnets per 100 m of track (rail) length: 8.
Average travelling speed: 100 m/s = 360 km/h.
linear damping system.
spring constant: 0.2 ton/cm
shock absorber: 0.5+0.6 ton cm/sec
horizontal angular frequency $\omega_{res}$.
(system carriage-spring-undercarriage): 10 rad/sec.

FIG. 8 shows a "suspended" levitated train. A carriage 60 is suspended from a truck provided with a first support magnet 61 which is disposed vertically beneath a second support magnet 62. The latter is in the form of a rail. The truck and the carriage are coupled by a linear damping system comprising a spring 63 and a shock absorber 64 (shown very schematically).

Stabilizing magnets 65 and 66 are disposed on either side of, and magnetically cooperate with, the support magnet 61. In this embodiment stabilization is vertical. The Mathieu diagram of FIG. 7 applies to this suspended carriage also.

What is claimed is:

1. A magnetically levitated and propelled carriage comprising a first permanent support magnet secured to the carriage, said first permanent support magnet cooperating magnetically via an air gap with a plurality of fixed second support magnets arranged in the form of a rail, and a stabilizing device for said carriage which comprises a row of alternately oppositely magnetized first stabilizing magnets fixed to said carriage and a row of alternately oppositely magnetized second stabilizing magnets arranged parallel to the rail, the length of a second stabilizing magnet measured in the travelling direction of the levitated carriage being substantially equal to that of each first stabilizing magnet, and wherein the support magnets and the stabilizing magnets are related so that the dynamic stiffness due to the stabilizing device is greater than the static stiffness due to the support magnets.

2. A magnetically levitated carriage as claimed in claim 1, characterized in that the stabilizing magnets form part of a linear motor thereby providing both lateral stability and linear propulsion for the carriage.

3. A magnetically levitated carriage as claimed in claim 1 wherein the carriage is provided with an undercarriage having at least two parallel arranged first support magnets the disposition of which corresponds to that of the second support magnets, the first and second support magnets being relatively magnetized in opposite directions, and means coupling the undercarriage to the carriage by a linear damping system which operates in a horizontal direction at right angles to the carriage travelling direction.

4. A magnetically levitated object as claimed in claim 3 wherein the support magnets, the stabilizing magnets and the linear damping system are designed to produce a Mathieu diagram of the form shown in FIG. 7 of the drawing with the system arranged to operate in the stable region between the lines 50 and 52 of said drawing.

5. A magnetically levitated carriage as claimed in claim 1 in the form of a suspended carriage, characterized in that the upper side of the carriage is provided with a suspension truck which comprises at least one said first permanent support magnet disposed beneath said plurality of second support magnets arranged in the form of a rail, the first and second support magnets being relatively magnetized in the same direction, and a linear damping system coupling the suspension truck to the carriage, the linear damping system being operative in a vertical direction.

6. A magnetically levitated vehicle comprising a first plurality of permanent magnets secured to the vehicle, a plurality of second permanent magnets arranged to form a trackway rail, said first and second magnets being in opposed relationship and magnetized to maintain an air gap between the vehicle and the trackway so as to provide friction-free magnetic support for the vehicle, and lateral stabilizing means to provide friction-free lateral stability for the vehicle in a direction perpendicular to its direction of travel, said lateral stabilizing means comprising first and second parallel rows of alternately oppositely magnetized first stabilizing magnets secured to opposite sides of the vehicle, and first and second rows of alternately oppositely magnetized second stabilizing magnets arranged parallel to the trackway rail and arranged to cooperate magnetically with the first and second rows of first stabilizing magnets, respectively, via respective air gaps, and wherein the support magnets and the stabilizing magnets are related so that the dynamic stiffness due to the lateral stabilizing means is greater than the static stiffness due to the support magnets thereby to maintain the air gaps between the first and second stabilizing magnets as the vehicle travels along the trackway.

7. A magnetically levitated vehicle as claimed in claim 6 wherein the first and second stabilizing magnets are of the same length in the direction of travel of the vehicle and said first and second stabilizing magnets provide the sole means of lateral support and stability for the vehicle.

8. A magnetically levitated vehicle as claimed in claim 6 wherein the first and second stabilizing magnets are of the same length in the direction of travel of the vehicle and further comprising magnetic propulsion means for propelling the vehicle along the trackway.

9. A magnetically levitated vehicle as claimed in claim 6 wherein said first stabilizing magnets are secured to the side walls of the vehicle in rows extending parallel to the vehicle direction of travel and magnetized perpendicular to the respective vehicle side walls and the second stabilizing magnets are magnetized perpendicular to the trackway rail.

10. A magnetically levitated vehicle as claimed in claim 6 wherein the support magnets and stabilizing magnets are designed so that the dynamic stiffness is at least six times greater than the static stiffness provided by the magnetic coaction of the first and second support magnets.

* * * * *